US008131314B2

(12) United States Patent
Grigsby et al.

(10) Patent No.: US 8,131,314 B2
(45) Date of Patent: Mar. 6, 2012

(54) SOCIALLY BASED STATION NAVIGATION

(75) Inventors: Travis M. Grigsby, Austin, TX (US);
Frank L. Jania, Chapel Hill, NC (US);
Darren M. Shaw, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 11/850,974

(22) Filed: Sep. 6, 2007

(65) Prior Publication Data

US 2009/0068971 A1    Mar. 12, 2009

(51) Int. Cl.
*H04B 7/00* (2006.01)
(52) U.S. Cl. ............... 455/526; 455/41.2; 455/150.1; 455/160.1; 455/185.1; 725/10; 725/18; 725/38; 725/62; 725/75
(58) Field of Classification Search ............ 725/9, 10, 725/14, 16, 18, 19, 28, 38, 59, 75, 62; 709/227, 709/228; 455/526, 125, 150.1, 154.1, 160.1, 455/185.1, 41.2
See application file for complete search history.

(56) References Cited

U.S. PATENT DOCUMENTS

| | | | |
|---|---|---|---|
| 5,749,043 A | 5/1998 | Worthy | |
| 7,054,601 B2 | 5/2006 | Heiderscheit et al. | |
| 7,444,339 B2* | 10/2008 | Matsuda et al. | 1/1 |
| 2004/0255336 A1* | 12/2004 | Logan et al. | 725/135 |
| 2005/0020223 A1 | 1/2005 | Ellis et al. | |
| 2006/0218225 A1 | 9/2006 | Hee Voon et al. | |
| 2006/0227673 A1* | 10/2006 | Yamashita et al. | 369/30.08 |
| 2006/0259429 A1 | 11/2006 | Hug | |
| 2008/0313665 A1* | 12/2008 | Francis et al. | 725/14 |

OTHER PUBLICATIONS

Hellweg, "Roadcasting: A Potential Mesh Network Killer App", Technology Review, <http://www.technologyreview.com/InfoTech/14545/>, Jun. 10, 2005 (last visited Sep. 6, 2007).
SHOUTcast Radio, <http://www.shoutcast.com/> (last visited Sep. 6, 2007).
LIVE365, <http://www.live365.com/index.live> (last visited Sep. 6, 2007).
Radio-Locator, <http://www.radio-locator.com/> (last visited Sep. 6, 2007).
Wen, "Internet Radio the P2P Way", Openp2p.com, <http://www.openp2p.com/pub/a/p2p/2002/09/24/p2pradio.html>, Sep. 24, 2002 (last visited Sep. 6, 2007).
Pandora, <http://www.pandora.com/> (last visited Sep. 6, 2007).

* cited by examiner

*Primary Examiner* — Dominic E Rego
(74) *Attorney, Agent, or Firm* — Cuenot, Forsythe & Kim, LLC

(57) ABSTRACT

A method of socially-based station navigation can include receiving station selection information from each of a plurality of mobile nodes within a mobile ad-hoc network, wherein station selection information comprises, for each mobile node, a station to which the mobile node is tuned. The method can include identifying each station from the received station selection information for each mobile node and determining a measure of popularity for each station according to a number of mobile nodes, from the plurality of mobile nodes, tuned to the station. A list specifying at least one of the stations and the measure of popularity of each station on the list can be output.

14 Claims, 4 Drawing Sheets

SOCIALLY BASED STATION NAVIGATION

BACKGROUND OF THE INVENTION

A mobile ad-hoc network refers to a self-configuring network of mobile routers and hosts connected by wireless communication links. The union of these nodes can form an arbitrary network topology in which routers and hosts are free to move randomly and organize arbitrarily. In this regard, the network topology can change rapidly and unpredictably.

A mesh network refers to a network in which continuous connections and reconfiguration around blocked paths, e.g., a failed node, can be performed by moving or "hopping" from node to node until a connection is established. This characteristic illustrates the "self-healing" nature of a mesh network in that the network may still function when a node becomes dysfunctional. As such, mesh networks generally are viewed as being dependable, whether implemented in a wired or wireless environment.

The advent of intelligent vehicle technologies has generated various proposals for equipping vehicles with the necessary wireless equipment for communicating over a wireless network. In some cases, the network may be a conventional mobile network having one or more access points, e.g., a centralized network. In other cases, the proposals have been directed to mobile networks, whether mobile ad-hoc, mesh, or a combination of both, where the network topology is defined by the movement of the vehicles on roadways and/or highway systems.

BRIEF SUMMARY OF THE INVENTION

The embodiments disclosed herein relate to improving station navigation for mobile nodes within a mobile ad-hoc network. One embodiment of the present invention can include a method of socially-based station navigation. The method can include receiving station selection information from each of a plurality of mobile nodes within a mobile ad-hoc network. Station selection information can specify, for each mobile node, a station to which the mobile node is tuned. The method further can include identifying each station from the received station selection information. For each station, a measure of popularity can be determined according to a number of mobile nodes, from the plurality of mobile nodes, tuned to the station. A list specifying at least one of the stations and the measure of popularity of each station on the list can be output.

Another embodiment of the present invention can include a system for socially-based station navigation. The system can include a wireless transceiver receiving station selection information from each of a plurality of mobile nodes within a mobile ad-hoc network. A controller identifying stations to which the plurality of mobile nodes are tuned from the station selection information, determining a measure of popularity for the stations, and outputting a list specifying at least one station and the measure of popularity of each station on the list. The system can further include a broadcast media receiver tuning to one of the stations identified from the station selection information.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
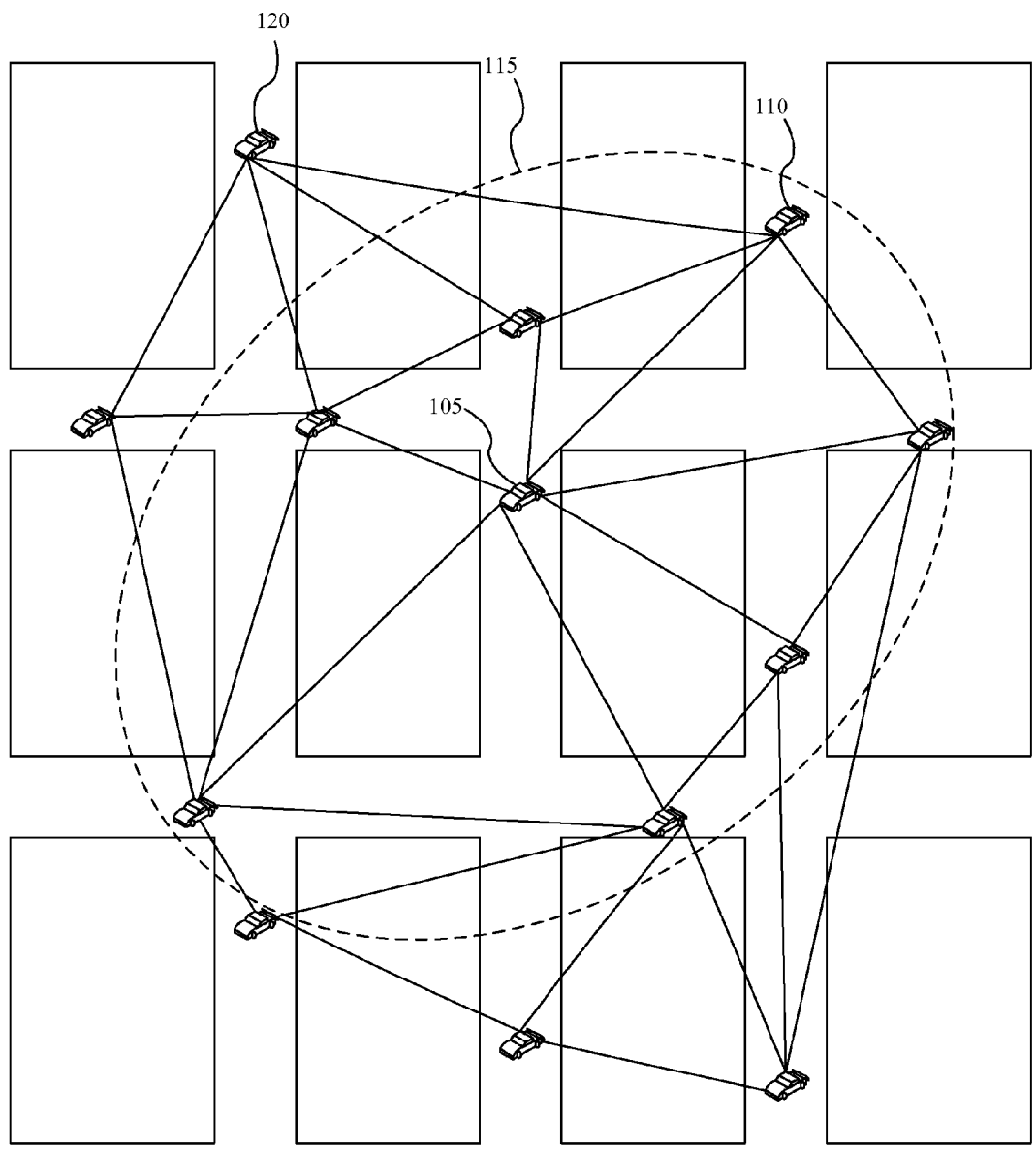
FIG. 1 is a block diagram illustrating a mobile ad-hoc network for socially-based station navigation in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments disclosed herein, vehicles can be configured to operate as mobile nodes capable of communicating with one another to form a mobile network. As such, each of the mobile nodes can share selected information, for example, station selection information, with other mobile nodes in the mobile network. A driver's vehicle, being configured as a mobile node, can receive station selection information from other vehicles in the vicinity. The information can be processed to identify one or more stations of interest. Within this specification the term "station" can refer to any broadcast media station or channel including, for example, AM, FM, and/or satellite radio stations, UHF, VHF, and/or satellite television stations, and/or any other media content that is or may be broadcast via a wireless transmitter.

Any stations of interest can be made available to the user via one or more controls of the driver's in-vehicle broadcast media receiver. This allows stations to be more effectively identified and navigated using the broadcast media receiver, thereby allowing the driver to keep his or her attention on the road. The term "broadcast media receiver" can refer to any number of devices capable of receiving broadcast media transmissions including, but is not limited to, radio receivers, satellite radio receivers, television tuners, satellite television receivers, and/or other media players, e.g., VCRs and/or DVD players, that may incorporate such broadcast media receivers.

Throughout this specification the terms "user," "driver," and "mobile node," e.g., the vehicle driven by a given user or driver, may be used interchangeably from time-to-time. As such, reference to a "mobile node" may also refer to the user associated with that mobile node, e.g., the driver. Similarly, reference to a "user" may also refer to the mobile node, e.g., vehicle, associated with, or that is driven by that user. Accordingly, when a user has a presence on the mobile network, the mobile node associated with that user can be said to have a presence on the mobile network. By the same token, when a mobile node has a presence on the mobile network, the user associated with that mobile node can be said to have a presence on the mobile network.

FIG. 1 is a block diagram illustrating a mobile ad-hoc network (mobile network) for socially-based station navigation in accordance with one embodiment of the present invention. In FIG. 1, the mobile nodes are illustrated as a series of vehicles, in this case automobiles, scattered throughout a road and/or highway system. Each vehicle represents a mobile node in the mobile network. Each mobile node, e.g., mobile nodes 105, 110, and 120, can be configured to include a wireless transceiver to communicate with one or more other nodes of the mobile network and a broadcast media receiver to receive local and/or non-local media broadcasts. Accordingly, each of the mobile nodes can communicate directly with one another and function as a relay and/or access point to form the mobile network. The mobile network may or may not be configured as a mesh-type mobile network.

As mobile node 105 and mobile node 110 move throughout the roadway system, the two mobile nodes 105 and 110 can form a wireless connection facilitating the transmission and reception of data between one another. This data can include station selection information for each of the mobile nodes 105 and 110, as well as for one or more other mobile nodes, e.g., mobile node 120, which may be routed through either mobile node 105 and/or mobile node 110. Station selection information can specify, for example, the station or channel to which the broadcast media receiver within a mobile node is tuned, one or more stations saved as favorites or presets within the broadcast media receiver of a mobile node, and/or a network address or other unique identifier of the mobile node sending the information. Station selection information further can include transmission path data and a time stamp specifying a time and/or date when the transmission originated.

A transmission path, as used herein, can specify an identifier of each mobile node through which the information has passed. For example, as station selection information is passed or routed through one mobile node to another, the mobile node functioning as a router can append or include its unique identifier to the transmission information such that any mobile node receiving the station selection information can determine the number of mobile nodes through which the information has passed as well as the originating mobile node. A time stamp also can be added by each mobile node functioning as a router in addition to the identifier of the mobile node.

If mobile nodes 105 and 110 exchange data directly with one another, it can be said that the two mobile nodes are separated by one "hop." If mobile node 120 communicates with mobile node 105 via mobile node 110, mobile nodes 120 and 105 can be said to be separated by two hops. Allowing communication over more than one hop allows more mobile nodes to join the mobile network and cover a larger geographical area.

In one embodiment, the size of the mobile network can be specified in terms of the number of hops from a selected mobile node. For example, consider the case where mobile node 105 is used as a reference mobile node, e.g., a "home mobile node." In that case, the mobile network can be limited to the area represented by region 115. In the example shown in FIG. 1, the size of region 115 can be specified as one hop from mobile node 105. In that case, only direct communications between mobile node 105 and other mobile nodes, e.g., communications over a single hop, will be permitted, thereby limiting the size of the mobile network. With a limitation of a single hop, mobile node 120 would be excluded from the mobile network from the perspective of mobile node 105. As such, mobile node 105 can be configured to drop or ignore any communications and/or data received from mobile node 120 or any other mobile node outside of the specified region 115.

It should be appreciated that the size of the mobile network, e.g., as defined by region 115, can be specified in terms of a larger number of hops, e.g., two, three, etc. As such, the embodiments disclosed herein are not intended to be limited to a particular network configuration or size. As mobile node 105 passes through a given geographic area, different mobile nodes may pass within range and join and/or leave the mobile network. Accordingly, the geographic size and/or shape of region 115 can vary as mobile node 105 shares station selection information with a dynamically changing collection of mobile nodes.

In operation, mobile node 105 can be moving through a geographic area. As mobile node 105 continues to move, one or more other mobile nodes, e.g., mobile node 110, may establish communication with mobile node 105 and form the mobile network or a portion thereof. Accordingly, mobile node 105 can receive station selection information from each mobile node within the mobile network, e.g., from each suitably configured mobile node within a specified number of hops of mobile node 105.

From the received station selection information, mobile node 105 can determine a measure of popularity for each station or channel specified in the station selection information received from the other mobile nodes. As noted, the station selection information for a mobile node can indicate the station or channel to which that mobile node is tuned. Responsive to a user input, the broadcast media receiver of mobile node 105 can be tuned to different ones of the stations identified from the station selection information.

Figure 2:
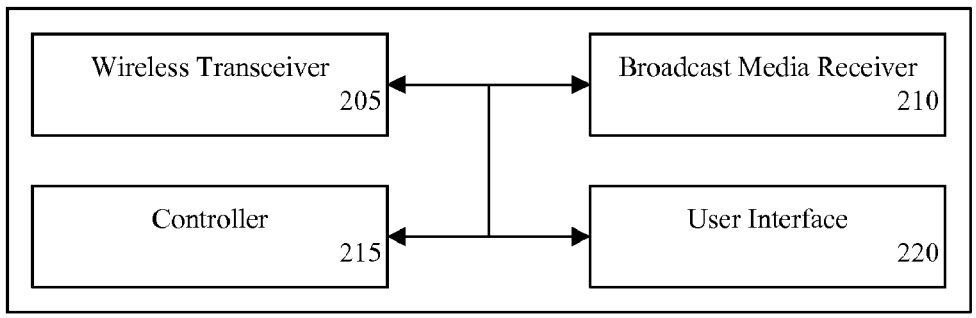
FIG. 2 is a block diagram illustrating a system for socially-based station navigation in accordance with another embodiment of the present invention.

FIG. 2 is a block diagram illustrating a system 200 for socially-based station navigation in accordance with another embodiment of the present invention. The system 200 can include a wireless transceiver 205, a broadcast media receiver 210, a controller 215, and a user interface 220. In one embodiment, the system 200 can be included within a vehicle, e.g., an automobile, truck, or the like, to effectively transform the vehicle into a mobile node. In another embodiment, the system 200 can be configured as a mobile device that an individual may be able to carry on his or her person. The wireless transceiver 205, the broadcast media receiver 210, the controller 215, and the user interface 220 can be interconnected via one or more wires, a communication bus, or other suitable circuitry.

The wireless transceiver 205 can send and receive wireless communications according to any of a variety of different communication standards and/or protocols. For example, the wireless transceiver 205 can send and receive communications according to protocols such as WiFi, WLAN 802.11 a/b/g/n, WiMax, WMAN 802.16, cellular, GSM, CDMA, or any other suitable communication standard. Accordingly, the wireless transceiver 205 can transmit and receive data between the home mobile node and different ones of the mobile nodes of the mobile network that are in range. In effect, the wireless transceiver 205 can receive and transmit station selection information to and from mobile nodes for use in a socially-based station navigation system.

The controller 215 can coordinate operation of the wireless transceiver 205, the broadcast media receiver 210, and the user interface 220. The controller 215 can be implemented as a microprocessor, a programmable logic device, as a collection of discrete components, or as any combination thereof. In one embodiment, the controller 215 can include suitable operational software that, when executed, processes station selection information, as described herein, and controls the various other components. For example, the controller 215 can calculate and determine a measure of popularity for stations to which other mobile nodes are tuned, as determined from received station selection information.

The controller 215 can output a list of one or more of the stations along with a measure of popularity for each of the stations on the list. As used herein, "outputting" and/or "output" can mean, for example, writing to a file, writing to a user display or other output device, playing audible notifications, sending or transmitting to another system, exporting, or the like. In one embodiment, the controller 215 can output such information to the broadcast media receiver 210. Further, the controller 215 can receive station selection information from, e.g., generated by, the broadcast media receiver 210 that is to be broadcast to one or more other mobile nodes via the wireless transceiver 205.

The broadcast media receiver 210 can be implemented as any device capable of receiving broadcast media signals, e.g., radio or television broadcast signals. The broadcast media receiver 210, however, is not limited to receiving such signals and may receive other signals, e.g., satellite radio or television signals or other broadcast signals as such signals become available whether terrestrial or not. Broadcast media receiver 210 can be tuned to stations of interest as well as store one or more favorite stations as described herein. For example, the broadcast media receiver 210 can be implemented as an AM/FM radio, a satellite radio, a television tuner, a satellite television receiver, a media player incorporating such a receiver, or as any combination thereof.

As noted, the broadcast media receiver 210 can communicate with the controller 215 to receive the list of stations and associated measures of popularity of such stations. The broadcast media receiver 210 can be configured to output the station to which the broadcast media receiver 210 is currently tuned to the controller 215. The broadcast media receiver 210 also can output a list of stored stations or presets to the controller 215. It should be appreciated, however, that such information also can be provided from the broadcast media receiver 210 directly to the wireless transceiver 205 for wireless transmission.

The user interface 220 can receive user inputs and communicate those inputs to the controller 215 and/or the broadcast media receiver 210. The user inputs received via the user interface 220 also can regulate or control operation of the wireless transceiver 205, e.g., via the controller 215. Feedback or output from the controller 215, the wireless transceiver 205, and/or the broadcast media receiver 210 can be provided to the user via the user interface 220. In one embodiment, the user interface 220 can be implemented as the face, faceplate, or control module or portion, of the in-vehicle broadcast media receiver, e.g., the broadcast media receiver 210. In another embodiment, the user interface 220 can be implemented as an in-dash display within a vehicle.

Although FIG. 2 shows system 200 as four distinct components, one skilled in the art will appreciate that one or more of the components may be combined. For example, in one embodiment the wireless transceiver 205 and the controller 215 can be contained in one device with the broadcast media receiver 210 and the user interface 220 being contained in a second device. In another embodiment, the wireless transceiver 205, the broadcast media receiver 210, the controller 215, and the UI 220 can be combined into a single, larger device. Further operation of the system 200 will be described with reference to the flow charts.

Figure 3:
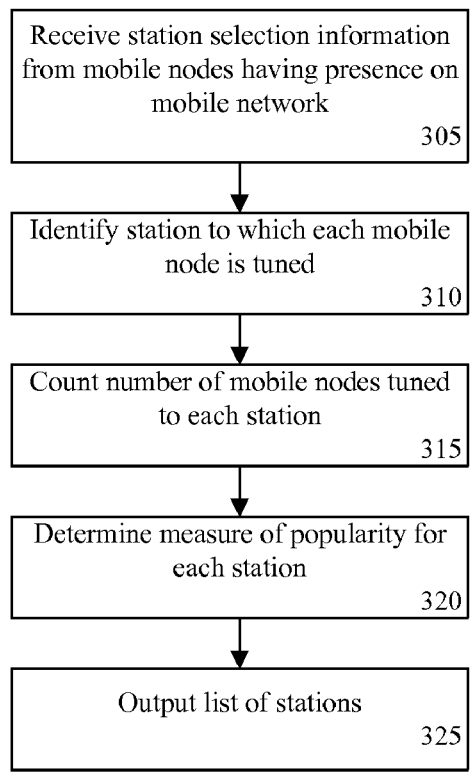
FIG. 3 is a flow chart illustrating a method of socially-based station navigation in accordance with another embodiment of the present invention.

FIG. 3 is a flow chart illustrating a method 300 of socially-based station navigation in accordance with another embodiment of the present invention. FIG. 3 presents a method of determining a measure of popularity for stations within the context of socially-based station navigation. The method 300 can be implemented using the system described with reference to FIGS. 1 and 2 or another system with the same or similar functionality. The method 300 processes station selection information transmitted by one or more mobile nodes within a mobile network to identify stations of interest to a home mobile node.

In step 305, a home mobile node can receive station selection information from one or more mobile nodes having a presence on the mobile network. In one embodiment, a query from the home mobile node can request the station selection information from other mobile nodes in range. Station selection information can be requested periodically, from time-to-time, or responsive to a particular event, e.g., a user input. In that case, station selection information can be received responsive to a request. In another embodiment, station selection information can be continuously broadcast by mobile nodes and, thus, continuously received by the home mobile node.

In any case, in step 310, the home mobile node can identify, from the received station selection information, the station(s) to which each of the plurality of mobile nodes is tuned. In step 315, the number of mobile nodes tuned to each identified station can be counted. In step 320, a measure of popularity for each identified station can be determined. In one embodiment, the measure of popularity can be the number of mobile nodes tuned to that station at a given time or within a given period or window of time as determined by the received station selection information. As noted, the station selection information can specify time stamp information.

In illustration, consider the case in which the home mobile node determines that 12 mobile nodes are tuned to radio station 98.7 FM, five mobile nodes are tuned to 103.1 FM, and two mobile nodes are tuned to 96.5 FM. In this example, radio station 98.7 FM would have the highest measure of popularity with a score of 12. Radio station 96.5 FM would have the lowest measure of popularity, e.g., two. A similar process can be performed with respect to satellite radio stations, television stations, or the like.

In step 325, a list specifying one or more of the stations can be output. The list, for example, can be output to the broadcast media receiver. In one embodiment, only the most popular station can be output. In another embodiment, the top "N" stations of a total of "M" stations identified from the station selection information, where N<M, can be output. In another embodiment, all M stations can be output. The list can be ordered or specify the measure of popularity of each station on the list.

Figure 4:
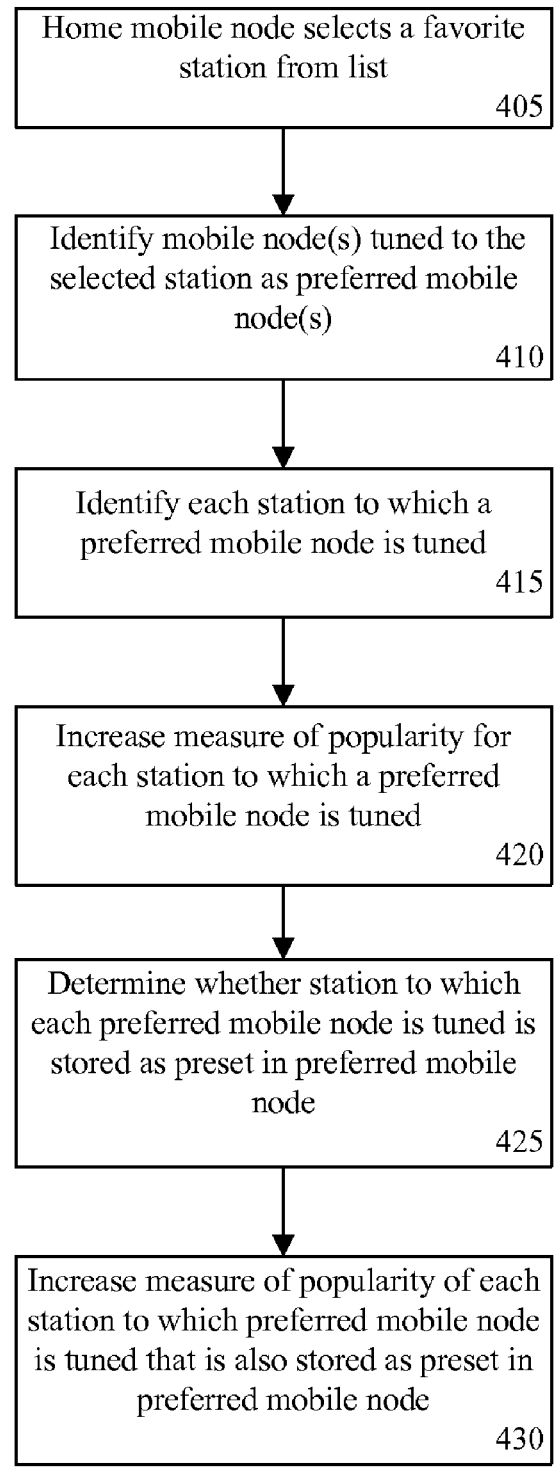
FIG. 4 is a flow chart illustrating a method of determining popularity of stations in accordance with another embodiment of the present invention.

FIG. 4 is a flow chart illustrating a method 400 of determining a measure of popularity for stations in accordance with another embodiment of the present invention. The method 400 can be implemented using the system described with reference to FIGS. 1 and 2 or another system with the same or similar functionality. The method 400 can be implemented as part of step 320 of FIG. 3. As such, method 400 can provide a technique for enhancing the manner in which the measure of popularity for one or more stations is computed.

In step 405, the home mobile node can select a favorite station from the list of stations, for example, as determined in FIG. 3. In one embodiment, "selecting" a station from the list can include tuning the broadcast media receiver to the selected station. In another embodiment, selecting can include storing a station, which may or may not be from the list of popular radio stations, into a preset of the broadcast media receiver.

In step 410, the home mobile node can use the station selection information to identify each mobile node that is also tuned to the station selected by the home mobile node. As noted, the station selection information can specify a unique identifier indicating the particular mobile node tuned to a given station. Each mobile node identified in step 410 can be considered a "preferred mobile node." For example, the driver of the home mobile node can activate a control to tune the television to a selected television station, e.g., channel 9, or store the selected station into memory. The home mobile node can search the station selection information for all other mobile nodes tuned to channel 9. Each identified mobile node can be designated as a preferred mobile node and stored for later use.

At some point in the future, whether several seconds, minutes, hours, or days after designating mobile node(s) as preferred mobile node(s), the home mobile node can continue to receive and process station selection information. Accordingly, in step 415, any stations to which preferred mobile nodes are tuned, presuming preferred mobile node(s) have a presence on the mobile network, as determined from the station selection information, can be identified. For example, once a mobile node, e.g., mobile node A, has been identified as a preferred mobile node, each time the home mobile node determines that mobile node A has a presence on the mobile network, the station to which mobile node A is tuned can be identified.

In step 420, the measure of popularity for the stations to which the preferred mobile node(s) are tuned can be increased. For example, a predetermined number may be added to each measure of popularity or the measure of popularity can be multiplied by a factor greater than one. Since the preferred mobile node has, in the past, been tuned to a station of interest to the home mobile node, it is considered likely that future station selections of the preferred mobile node will track the musical or viewing tastes of the home mobile node more closely than selections of other mobile nodes. It should be appreciated that the measure of popularity of a station to which a preferred mobile node is tuned can be increased beyond the initial score, e.g., count, described with reference to FIG. 3.

In one embodiment, storing a station as a preset within the broadcast media receiver can be considered to be more significant than tuning the broadcast media receiver to a particular station. In such an embodiment, the mobile nodes tuned to the station stored as a preset in the home mobile node can be considered "highly preferred," e.g., above those mobile nodes tuned to a radio or television station to which the home mobile node is tuned, but has not stored as a preset. The weight accorded to radio stations to which "highly preferred" mobile nodes are tuned can be greater than radio stations to which preferred mobile nodes are tuned.

In steps 425 and 430, a further enhancement to the popularity measure of stations may be optionally performed. In step 425, the home mobile node can determine whether the station to which each preferred mobile node is tuned has been stored as a preset in the preferred mobile node. Accordingly, in step 430, the measure of popularity of the station to which the preferred mobile node is tuned, if stored as a preset in the broadcast media receiver of the preferred mobile node, can be further increased.

Those skilled in the art will appreciate that other embodiments are also contemplated. For example, once a mobile node is designated as a preferred mobile node, each station that is stored as a preset in the broadcast media receiver of the preferred mobile node can be added to the list of stations whether or not the preferred mobile node is currently tuned to one of the presets. In another embodiment, the presets can be filtered according to genre, if such information is available within the mobile network. For example, if the mobile node is a preferred mobile node because the home mobile node selected a talk radio station to which the preferred mobile node was tuned, only talk radio presets from the preferred mobile node may be added or considered for inclusion on the list. Alternatively, a driver of the home mobile node can set one or more genre preferences to which radio stations can be compared and matched. Only those radio stations matching the genre preferences can be added to the list.

In another embodiment, a preferred mobile node for one media type, e.g., satellite television, may also be considered a preferred mobile node for a different media type, e.g., FM radio. Alternatively, the determination of whether a mobile node is preferred or not can be restricted to only within a single media type. That is, if a mobile node is preferred in terms of FM radio stations, that same mobile node may not be considered preferred with respect to satellite television until such time as stations have been selected or stored as described herein. Further, it should be appreciated that filtering an be applied cross-media types. That is, if a mobile node is preferred for a particular genre of television, that mobile node may or may not be considered preferred for the same genre, but applied to radio.

The particular ordering of metrics as discussed with reference to the flow charts and throughout this specification is presented for purposes of illustration and not to limit the embodiments disclosed herein or to suggest any one particular technique for determining station importance. As such, it should be appreciated that the various metrics for determining popularity of stations disclosed herein may be used individually or in any combination.

Figure 5:
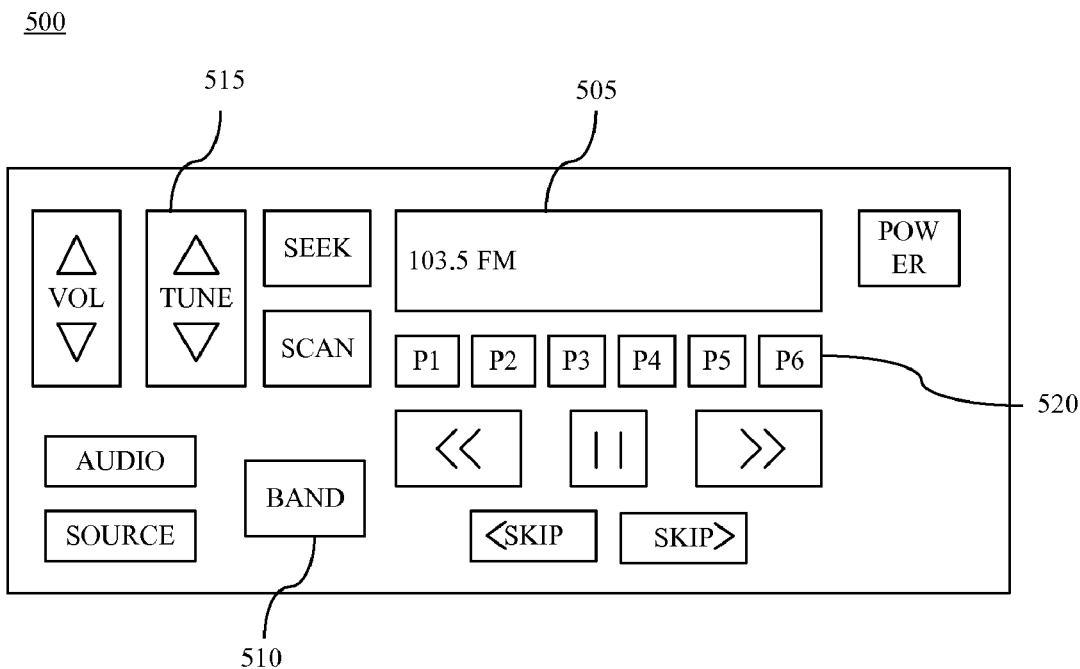
FIG. 5 is a block diagram illustrating frontal view of a broadcast media receiver which is useful for understanding the embodiments disclosed herein.

FIG. 5 is a block diagram illustrating a faceplate 500 of a broadcast media receiver for use with socially-based station navigation in accordance with another embodiment of the present invention. In this example, the broadcast media receiver is implemented as a radio. While illustrated as a radio, however, it should be appreciated that the following discussion may be applied to other broadcast media receivers, e.g., television, or any media players having controls that may function as a user interface and which may be programmably mapped or re-mapped to perform the functions described herein.

The faceplate 500 illustrates one embodiment of a user interface for the system described with reference to FIG. 2. A display 505 shows the particular frequency, e.g., channel or radio station, including band, to which the radio receiver is tuned. When band button 510 is actuated, the radio receiver can be placed in a "most popular tuning mode." In this mode, station selection information can be used as described herein. In one embodiment, responsive to being placed into the most popular tuning mode, the radio receiver can be automatically tuned to the most popular radio station, e.g., the radio station having the highest measure of popularity.

A list of one or more radio stations and the measure of popularity for each of the radio station(s) can be generated or otherwise made available to the radio receiver. Responsive to each actuation of tuning button 515, the radio receiver can be successively tuned to each station on the list. For example, responsive to a first actuation of the tuning button 515, the radio receiver can be tuned to the station with the highest measure of popularity if not already tuned thereto. Responsive to each successive actuation, the radio receiver can be tuned to the station with the next highest measure of popularity. The list of radio stations can be traversed up or down according to whether an up or down tuning button or control is actuated by the user.

Actuation of one or more preset buttons 520 (labeled P1-P6) can cause the radio receiver to store a favorite radio station when in the most popular tuning mode. Upon storing the favorite radio station, the controller can identify any mobile nodes tuned to the same radio station as the home mobile node and perform other functions as described herein. Any such mobile nodes can be considered preferred mobile nodes.

When calculating measures of popularity, any radio stations to which the preferred mobile nodes are tuned can be given an increased measure of popularity. Also, the measure of popularity for radio stations stored in the presets of the preferred mobile node(s) can be increased. The controller can determine a list of the most popular radio stations and output the list to the broadcast media receiver. Applying the techniques disclosed herein can result in a list of most popular radio stations that more closely reflects the musical tastes of the home mobile node.

It should be appreciated that the home mobile node can contain multiple broadcast media receivers and/or media devices that can be configured to communicate with one another and the components described herein. As such, in the case where a mobile node changes from one media type to another, e.g., radio to television, the embodiments disclosed herein can be applicable to both or each media type available in the mobile node. For example, the controller can store and process station selection information for multiple media types serially or concurrently, thereby allowing the mobile node to switch between different media types, or play more than one media type simultaneously, such that station preference and popularity information as described herein is available for each media type and/or playback system. In that case, a centralized user interface, e.g., faceplate, in dash video screen, navigation system, etc., can be used to access the functions described herein. Notwithstanding, the functions described herein also can be controlled through each individual media device and/or playback system.

For example, a vehicle may include an in-dash controller from which to control a television tuner and a radio receiver. A driver may select one or more socially determined radio stations. While listening to a radio station, the driver may actuate an "input" button on the in-dash controller to select the television tuner. Upon switching to the new media type, socially determined station information can be made available, for example, after the television tuner is placed in a social station navigation mode. Once in such a mode, stations from the list of socially determined stations can be navigated using various controls of the media system, e.g., whether the radio, a remote control, the television tuner, or a centralized control system. Those skilled in the art will appreciate that these are but a few of the many embodiments contemplated by the present invention.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

The invention claimed is:

1. A method of socially-based station navigation comprising:
    receiving station selection information from each of a plurality of mobile nodes within a mobile ad-hoc network, wherein station selection information comprises, for each mobile node, a station to which the mobile node is tuned;
    identifying each station from the received station selection information;
    for each station, determining a measure of popularity according to a number of mobile nodes, from the plurality of mobile nodes, tuned to the station; and
    outputting a list specifying at least one of the stations and the measure of popularity of each station on the list.

2. The method of claim 1, further comprising:
    selecting a station from the list; and
    tuning a broadcast media receiver to the selected station.

3. The method of claim 2, wherein the selected station is the station from the list having a highest measure of popularity.

4. The method of claim 2, further comprising tuning the broadcast media receiver to a different station from the list according to the measures of popularity.

5. The method of claim 1, further comprising:
    selecting a first station from the list; and
    identifying each mobile node tuned to the first station as a preferred mobile node, wherein determining a measure of popularity comprises increasing the measure of popularity for a second station when a preferred mobile node is tuned to the second station.

6. The method of claim 1, further comprising:
    selecting a first station from the list; and
    identifying each mobile node tuned to the first station as a preferred mobile node, wherein determining a measure of popularity comprises increasing the measure of popularity for a second station when a preferred mobile node has stored the second station as a preset.

7. The method of claim 1, further comprising, responsive to a user request, automatically tuning a broadcast media receiver to the station having the highest measure of popularity.

8. The method of claim 1, further comprising restricting the mobile nodes from which station selection information is considered to only those mobile nodes within a predetermined number of hops.

9. The method of claim 1, further comprising transmitting station selection information to at least one other mobile node in the mobile ad hoc network.

10. A system for socially-based station navigation comprising:
    a wireless transceiver receiving station selection information from each of a plurality of mobile nodes within a mobile ad-hoc network;
    a controller identifying stations to which the plurality of mobile nodes are tuned from the station selection information, determining a measure of popularity for the stations, and outputting a list specifying at least one station and the measure of popularity of each station on the list; and a broadcast media receiver tuning to one of the stations identified from the station selection information.

11. The system of claim 10, wherein the broadcast media receiver tunes to a station having a highest measure of popularity from the list of stations.

12. The system of claim 11, wherein the broadcast media receiver tunes to a different station from the list according to the measures of popularity.

13. The system of claim 10, wherein a first station is selected from the list, wherein the controller identifies each mobile node tuned to the first station as a preferred mobile node and determines a measure of popularity for a second station, at least in part, according to whether a preferred mobile node is tuned to the second station.

14. The system of claim 10, wherein a first station is selected from the list, wherein the controller identifies each mobile node tuned to the first station as a preferred mobile node and determines a measure of popularity for a second station, at least in part, according to whether the preferred mobile node has stored the second station as a preset.

* * * * *